April 2, 1940.  J. F. WALLACE  2,196,089
RESILIENT STRUT
Filed Nov. 2, 1933  2 Sheets-Sheet 1

INVENTOR:
JOHN F. WALLACE
ATTORNEYS

April 2, 1940.  J. F. WALLACE  2,196,089
RESILIENT STRUT
Filed Nov. 2, 1933  2 Sheets-Sheet 2

INVENTOR:
JOHN F. WALLACE
Kwin Hudson & Kent
ATTORNEYS

Patented Apr. 2, 1940

2,196,089

UNITED STATES PATENT OFFICE 2,196,089

RESILIENT STRUT

John F. Wallace, Cleveland, Ohio, assignor to The Cleveland Pneumatic Tool Company, Cleveland, Ohio, a corporation of Ohio Application November 2, 1933, Serial No. 696,408

22 Claims. (Cl. 267—64)

This invention relates to improvements in resilient struts, that is to say, shock absorbing struts. Primarily it is designed for use upon airplanes to cushion the impact of landing and to absorb the shocks of taxying. In addition to the usual functions of such apparatus, the device of the present invention serves to prevent a swivelling action between the two telescoping members of the strut and thus maintains in proper alignment the wheels of the airplane, which are carried by the lower member of the strut.

One of the objects of the invention is the provision of splined interfitting surfaces between the two telescoping parts of a hydraulic strut, so arranged that the splined surfaces are entirely within the sealed part of the strut and are lubricated by the liquid within the strut.

Another object of the invention is the provision of novel means for regulating the flow of liquid through metering openings in such a manner as to automatically adjust the rate of flow to the load at any given instant, thereby making the operation of the device sufficiently flexible to fit all conditions in a highly satisfactory manner.

Still another object is the provision of novel valve means for varying the rate of flow of liquid through a piston or other partition employed in hydraulic shock absorbers.

Other objects and features of novelty will appear as I proceed with the description of those embodiments of the invention which, for the purposes of the present application, I have illustrated in the accompanying drawings, in which Fig. 1 is an elevational view, partly in central vertical section, of an airplane strut embodying certain features of the invention;

Figures 1, 2:
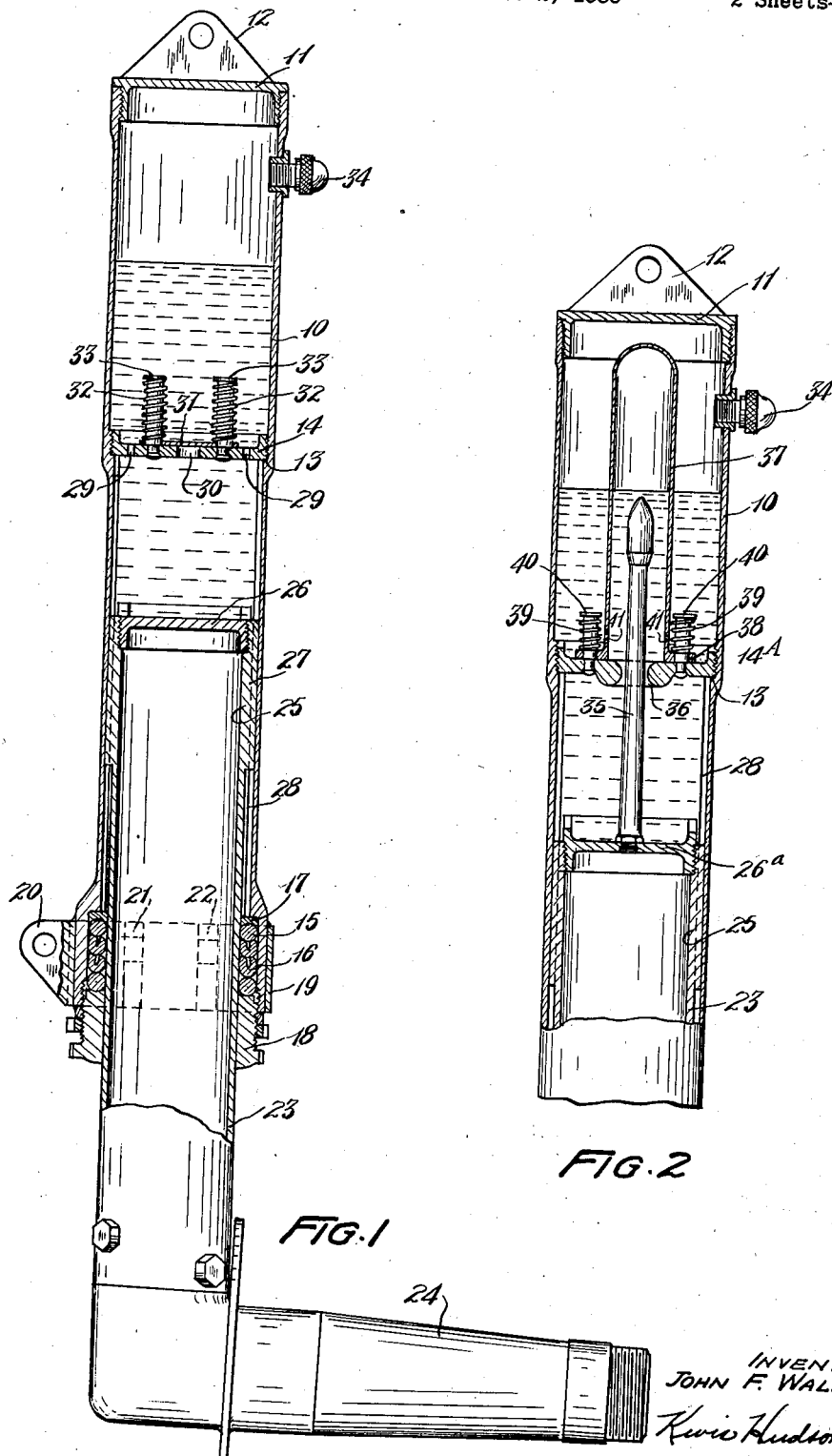
Fig. 2 is a fragmentary central vertical sectional view illustrating a strut embodying a modified form of valve.
Figure 4:
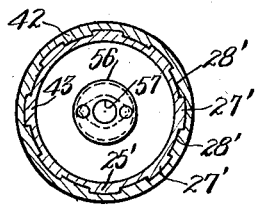
Fig. 4 is a horizontal sectional view taken substantially on the line 4—4 of Fig. 3.

In Fig. 1 I have illustrated a relatively long strut, comprising an upper outer cylinder 10 closed at its upper end by a cap 11 which is provided with a bracket 12 by means of which the strut may be attached to some element carried by the fuselage or wing structure of the airplane.

At an intermediate point in the length of the cylinder, its diameter is reduced somewhat, and at this point a shoulder 13 is formed. Just above this shoulder a partition 14 is threadably mounted in the cylinder. The wall of the cylinder below the shoulder is thickened.

The lower end of the cylinder 10 is enlarged to form an annular pocket 15, within which is mounted a packing 16 of a character such that it will expand laterally when subjected to pressure axially of the strut. For a more particular description of this packing, reference may be had to my Patent No. 1,888,578 issued November 22, 1932. At the inner end this packing is engaged by a metal ring 17 which is free to move in pocket 15, while at its outer end it is engaged by a gland ring 18 threaded into the end of the cylinder. Around the lower enlarged part of the cylinder I mount a clamping band 19 upon which are formed perforated ears 20, 21 and 22 for attachment to rigid struts or tie rods by means of which the cylinder may be held in the desired position.

Within the outer cylinder 10 there is slidably mounted a lower inner cylinder 23. At its lower extremity, the latter cylinder may carry a wheel spindle 24 upon which a ground wheel (not shown) may be mounted. Preferably the axis of spindle 24 forms an angle with the axis of cylinder 23 slightly greater than 90°. By this means I am enabled to incline the lower part of the ground wheel inwardly while maintaining the cylinders 10 and 23 practically vertical, and, if desired, the wheel tire may be caused to engage the ground substantially in line with the common axis of the two cylinders.

At its upper end the side walls of the cylinder 23 are thickened to form a head 25, into which is threaded a partition 26 constituting a piston. The outer surface of head 25 is machined to form splines 27, and the inner surface of cylinder 10 from the shoulder 13 down to the pocket 15 is formed with splines 28, the splines of one cylinder interfitting with those of the other cylinder.

Below the head 25, the outer surface of cylinder 23 is smooth, and it is this smooth surface which is engaged by packing 16. When the cylinders are extended as far as possible, the head 25 engages the ring 17 and presses the packing against the gland ring 18, thereby expanding it laterally and providing a highly effective seal. When the head 25 is not in contact with the ring 17, however, this pressure is relieved somewhat, and the friction against the cylinder 23 is lessened, so that the relative movement of the two cylinders may take place freely. More or less liquid may leak past the head 25 along the interengaging splined surfaces and collect between the head and the ring 17 in the spaces between the splines 28, and upon a sudden movement of expansion in the strut, pressure is applied through this liquid against ring 17 so that the packing 16 is again expanded laterally, applying added friction to the cylinder 23 and thereby assisting in checking the rebound stroke.

The partition 14 is provided with a plurality of holes 29 of small size, through which liquid is metered as the piston 26 moves up and down with respect to the partition. Under some conditions, these holes do not provide sufficient relief for the pressure set up under the partition. For such occasions I provide a larger opening 30 formed centrally in the partition 14 and normally covered by a valve plate 31 which is held to its seat resiliently by coil springs 32 surrounding headed posts 33 set into the partition 14 and held in place by a riveting operation. Obviously, when the pressure exerted upon plate 31 through opening 30 becomes great enough, the springs 32 will yield and the plate will rise, permitting a relatively rapid flow of liquid upwardly through the partition. This may continue for a very brief interval only or for a longer interval, depending upon the amount of pressure, and the opening and closing of the port 30 may occur more than once during a given upward travel of piston 26. Substantially this same type of partition and automatic valve is illustrated and described in my prior Patent No. 1,888,578 above mentioned.

As indicated in Fig. 1, the strut carries oil or other liquid in the space between piston 26 and partition 14 and above the latter partition, the approximate level of oil when the strut is supporting its share of the weight of an airplane being illustrated in that figure. Above the oil level there is air under pressure, which tends to expand the strut and upon which the weight of the airplane is supported. A combined filler plug and air valve 34 serves as a means for admitting oil and for air hose connections during the inflation of the strut.

Fig. 2 shows a modification of the construction of Fig. 1, in which there is a piston 26a having a central threaded opening in which is mounted a tapered metering pin 35 that projects upwardly through a central opening 36 in a partition 14A, similar in construction, location, and function to partition 14. There are no openings through the partition 14A except the central opening 36. A tube 37, closed at its upper end, surrounds metering pin 35, and at its lower end is provided with a flange 38 which normally engages the upper surface of the partition, against which it is resiliently held by coil springs 39 surrounding headed posts 40, these latter parts being similar in construction and function to the springs 32 and posts 33 of Fig. 1. In the side walls of tube 37 there are small holes 41 which have a function similar to that of holes 29 in Fig. 1, that is to say, they accommodate the flow of liquid through the partition under relatively light impact loads, and all flow under the rebound stroke. When the impact is heavy and sudden, as it will be generally during landing, the air above the liquid in the tube 37 will be compressed sufficiently to lift the tube 37 against the action of the springs 39, and liquid will flow outwardly between the partition 14A and the flange 38 into the space above the partition and outside the tube 37.

The metering pin 35 functions in the usual manner of a metering pin, that is to say, it progressively changes the effective size of the opening 36 as the piston 26a approaches or recedes from the partition. The tube 37, with its flange 38, takes the place of the plate 31 in Fig. 1, that is, it provides an automatic valve which may be employed where a metering pin is also employed. The resulting action is somewhat different from that of Fig. 1, however, because the tube is lifted by air pressure instead of by pressure transmitted exclusively through an incompressible fluid. The lifting of the tube 37 is therefore somewhat delayed as compared with the lifting of the plate 31 in Fig. 1, that is, a greater movement of piston 26a must occur before the valve lifts than in the case of piston 26, and the closing of the automatic valve in Fig. 2 will be a little more prompt than in Fig. 1, because the springs 39 are assisted by the compressed air in the upper end of tube 37.

Figure 3:
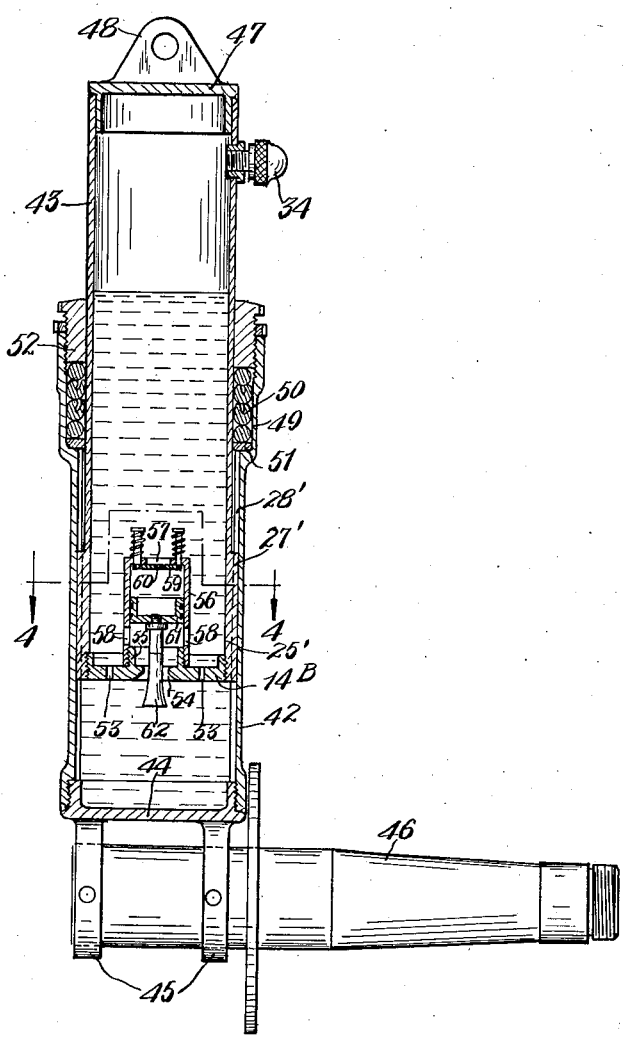
Fig. 3 is a view similar to Fig. 1, of a further modification.

In Fig. 3 I have shown certain features of my invention applied to an airplane strut of a somewhat different type, that is, one in which the usual arrangement of the cylinders is inverted, the outer cylinder being the lower cylinder and the inner cylinder being the upper cylinder. It is a desirable arrangement where the length of the strut must be restricted on account of the design of the airplane upon which the strut is to be used.

This construction includes an outer lower cylinder 42 and an inner upper cylinder 43. The outer end of the lower cylinder is closed by a cap 44 which is threaded into the end of the cylinder and carries a pair of ring brackets 45 to which is fastened a wheel spindle 46. The inner cylinder 43 has a cap 47 at its outer end which may be welded to the cylinder and carries a bracket 48 for attachment to the airplane.

The outer cylinder is formed with an enlargement at its inner end, in which there is a pocket 49 for a packing 50, with a metal ring 51 and a gland ring 52 precisely the same as the corresponding parts in Fig. 1. This packing bears against the smooth outer surface of the cylinder 43. At the lower end of the latter cylinder, however, there is a head 25', in the outer surface of which are cut splines 27' similar to the splines 27 of Fig. 1, the splines 27' being interfitted with splines 28' formed on the inner surface of cylinder 42 and extending from the pocket 49 to the cap 44. These interengaging splines prevent swivelling, as in the case of Fig. 1.

Inasmuch as there is no partition in the outer cylinder of this construction, the automatic valve is mounted on a partition which constitutes a piston 14B. The valve itself might be like either one of the valves shown in Figs. 1 and 2, but I have illustrated in this connection a different form of valve wherein a metering pin of a different style may be utilized. The piston is provided with continuously open holes 53 of small size and a central opening 54 of larger size. Around this central opening there is an upwardly extending annular flange 55 upon which is threaded a small cylinder 56 which is closed at its upper end except for a central port 57, and is provided with a plurality of ports 58 in its side walls directly above the flange 55. The port 57 is normally closed by a spring controlled valve plate 59, in which there is a small central opening 60. Within the cylinder 56 there is a piston 61 which is closely fitted to the cylinder, and carries centrally a depending tapered metering pin 62. The operation of this form of valve is somewhat different from that of either of the forms heretofore described. When the strut is at rest, the piston 61 is in its lowermost position, closing off ports 58. When a small shock is encountered, liquid flows through the holes 53 and the piston 61 may rise slightly to permit some flow through opening 54 and the partially open ports 58. On the rebound, liquid enters the space within cylinder 56 through port 57, the plate 59 being unseated. The piston 61 is thereby forced down to its lowermost position, and the metering of liquid must take place exclusively through the holes 53, thereby checking the rebound.

When the strut receives a heavy impact, the liquid pressure beneath the piston 61 and against the lower end of pin 62 expels the liquid above the piston through a small hole 60 as rapidly as the small size of that hole will permit, thereby uncovering more or less of the ports 58 in order that flow through the piston may take place at a faster rate and in order that some of the impact may be absorbed by the highly resilient air in the upper end of the strut. When the impact is particularly heavy, the piston 61 may rise high enough in the cylinder 56 to bring the larger lower end of pin 62 into the opening 54, thereby retarding the flow.

It will be appreciated that this valve may be employed with or without the metering pin. Its action is hydraulically controlled, as distinct from the valves previously described where the action is either spring-controlled or controlled by springs in conjunction with compressed air.

Its operation may be varied by changes in the size of the holes 60, as well as by changes in the size or number of holes 53.

In Figs. 5 to 8 inclusive, I have shown three other forms of valves which may be substituted for the valve 14 of Fig. 1 or the valve 14B of Fig. 3.

Figure 6:
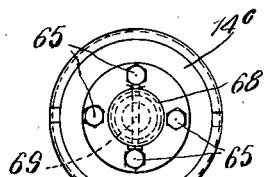
Fig. 6 is a top plan view of the same.
Figure 5:
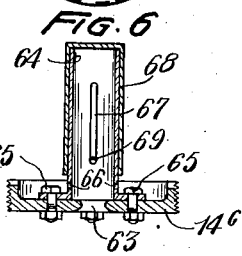
Fig. 5 is a vertical sectional view of a piston or other partition embodying a modified form of liquid metering valve.

In Figs. 5 and 6, the part 14C, which may constitute either the head of a piston or a partition like that shown at 14 in Fig. 1, has a central opening 63. Supported upon the part 14C concentrically with the opening 62, there is an open ended cylinder 64 with a horizontal flange at its lower end that is anchored to part 14C by bolts 65 or the like. Near its lower end the cylinder 64 is provided with a plurality of small openings 66. It is also provided with a pair of diametrically opposite longitudinally extending slots 67. The outer cylinder 68, with an upper closed end, is telescoped upon cylinder 64 and carries a pin 69 which extends through the slots 67. Pressure within the strut above the part 14C acts upon the closed end of cylinder 68 and tends to hold it down, that is, in the position illustrated in Fig. 5. Upon the occurrence of a shock and the building up of pressure beneath the part 14C and within the cylinder 64, 68 too great to be relieved by the flow of liquid through the small holes 66, the cylinder 68 rises, exposing more or less of the slots 67 through which liquid flow takes place. This valve is also controlled exclusively by fluid pressure in the strut.

Figure 7:
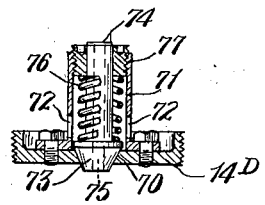
Figs. 7 and 8 are views similar to Fig. 5, showing further modifications.

In Fig. 7, the plate 14D has no opening therethrough except the central conical opening 70. To the plate around this opening there is secured by any suitable means a sleeve or cylinder 71 having side ports 72. Within this sleeve there is a conical valve piece 73 on the lower end of a stem 74, the valve piece and stem being drilled axially to form a central continuously open passage 75. A coil spring 76 surrounds the stem 74 and presses at its lower end against the valve piece 73 and at its upper end against a collar 77 which is threaded into the sleeve and has a smooth bore by means of which the stem 74 is guided. The tension of the spring may be varied by adjustment of the collar 77. This valve functions somewhat like that shown in Fig. 1, but it may be noted that when the valve piece 73 is lifted off its seat, the effective area exposed to pressure is increased, and the closing of the valve is delayed somewhat. Variations in operation are accomplished by the adjustment of the collar 77.

Figure 8:
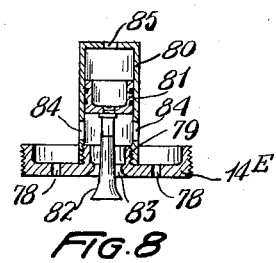

The form of valve illustrated in Fig. 8 is quite similar to that of Fig. 3. The plate 14E is provided with small openings 78 like the openings 53 of Fig. 3. It also has an annular flange 79 on which is threaded a cylinder 80 in which slides a piston 81 supporting a metering pin 82 which extends through a central opening 83 in the plate 14E.

The cylinder has side ports 84 and an end port 85. The operation of this device is quite similar to that of Fig. 3. On the rebound, liquid can enter the space within the cylinder 80 above the piston 81 somewhat more slowly than through port 57 with the valve plate 59 unseated. On the impact stroke, the piston 81 rises at a rate of speed more or less in proportion to the force of the impact, except that the size of the stream flowing through the ports 85 is affected by the speed of flow, in accordance with a well known law of hydraulics, that is to say, if the speed of flow is moderate, the quantity of liquid passing through the orifice at any given instant is greater than it is when the speed is considerably increased.

Variations from the described structures may be employed. Accordingly, I desire it to be understood that the scope of the invention is to be regarded as defined exclusively by the appended claims rather than by the foregoing description or the accompanying illustrations.

Having thus described my invention, I claim:

1. A ground wheel mounting, comprising a wheel spindle, a hydraulic shock absorber having two telescoping cylinders, the lower cylinder being rigidly attached to said spindle and the upper cylinder being adapted to be attached to an airplane, interfitting splines on said cylinders, the outer cylinder at its inner end carrying packing, and the inner cylinder having a smooth surface behind the splines engaged by said packing.

2. A ground wheel mounting, comprising a wheel spindle, a hydraulic shock absorber having two telescoping cylinders, the lower cylinder being rigidly attached to said spindle and the upper cylinder being adapted to be attached to an airplane, splines on the inner end of the inner cylinder, splines on the outer cylinder interengaging the splines on the inner cylinder, said outer cylinder splines stopping short of the inner end of that cylinder, and packing mounted in the inner end of the outer cylinder contacting with the outer surface of the inner cylinder behind the splines thereof.

3. A ground wheel mounting, comprising a wheel spindle, a hydraulic shock absorber having two telescoping cylinders, the lower cylinder being rigidly attached to said spindle and the upper cylinder being adapted to be attached to an airplane, splines on the inner end of the inner cylinder, an enlargement at the inner end of the outer cylinder, packing mounted in said enlargement and contacting with the outer surface of the inner cylinder behind the splines thereof, and the outer cylinder having internal splines between its outer end and said enlargement, said two sets of splines interfitting for the prevention of relative rotation between the two cylinders, and said splines being lubricated by the liquid within the shock absorber.

4. In a shock absorbing strut, two telescoping cylinders, packing carried by the inner end of the outer cylinder and engaging the exterior wall of the inner cylinder, said packing being so constituted as to expand laterally when compressed axially of the strut, splines on the inner surface of the outer cylinder behind said packing, the inner end of the inner cylinder having a head, and splines formed in said head interfitting with the first named splines, said head being adapted to engage said packing endwise when the shock absorber is fully extended.

5. A ground wheel mounting, comprising a wheel spindle, a hydraulic shock absorber having two telescoping cylinders, the lower cylinder being rigidly attached to said spindle and the upper cylinder being adapted to be attached to an airplane, interengaging splines on said cylinders, the splines of said inner cylider being entirely covered by the outer cylinder in the fully extended position of the shock absorber.

6. A ground wheel mounting, comprising a wheel spindle, a hydraulic shock absorber having two telescoping cylinders, the lower cylinder being rigidly attached to said spindle and the upper cylinder being adapted to be attached to an airplane, means upon the inner cylinder cooperating with means upon the outer cylinder for preventing relative rotation of the two cylinders about their common axis, said inner cylinder means being enclosed and concealed by the outer cylinder in all relative positions of compression or expansion.

7. A ground wheel mounting, comprising a wheel spindle, a hydraulic shock absorber having two telescoping cylinders, the lower cylinder being rigidly attached to said spindle and the upper cylinder being adapted to be attached to an airplane, means entirely enclosed within the cylinders in all relative positions of compression or expansion of the latter for preventing relative rotation of the cylinders about their common axis, said rotation preventing means being so arranged and constructed as to distribute the strain from a twisting force throughout the peripheries of the cylinders.

8. A ground wheel mounting, comprising a wheel spindle, a hydraulic shock absorber having two telescoping cylinders, the lower cylinder being rigidly attached to said spindle and the upper cylinder being adapted to be attached to an airplane, external splines on the inner cylinder, internal splines on the outer cylinder interengaging the first named splines, said splines being exposed to the operating liquid of the shock absorber, whereby lubrication of the splines is insured at all times.

9. A ground wheel mounting, comprising a wheel spindle, a hydraulic shock absorber having two telescoping cylinders, the lower cylinder being rigidly attached to said spindle and the upper cylinder being adapted to be attached to an airplane, external splines on the inner cylinder, internal splines on the outer cylinder interengaging the first named splines, said splines being exposed to the operating liquid of the shock absorber, whereby lubrication of the splines is insured at all times, and said splines on the inner cylinder being covered and concealed at all times by the outer cylinder.

10. In a shock absorber, two upright telescoping cylinders, the lower one carrying a wheel mounting and the upper one comprising means for attachment to an airplane, and interfitting splines on said cylinders, the outer cylinder at its inner end carrying packing and the inner cylinder having a smooth surface behind the splines engaged by said packing.

11. In a shock absorber, two upright telescoping cylinders, the lower one carrying a wheel mounting and the upper one comprising means for attachment to an airplane, and interfitting splines on said cylinders, the splines of said inner cylinder being entirely covered by the outer cylinder in the fully extended position of the shock absorber.

12. In apparatus normally subjected to heavy torsional strains, two telescoping cylinders, said cylinders having interengaging splines evenly spaced at acute angles throughout their extent for preventing relative rotation, the outer cylinder at its inner end carrying packing and the inner cylinder having a smooth surface behind the splines engaged by said packing.

13. In apparatus normally subjected to heavy torsional strains, a shock absorber comprising two telescoping cylinders, said cylinders having interengaging splines evenly spaced at acute angles throughout their extent for preventing relative rotation, the splines of said inner cylinder being entirely covered by the outer cylinder in the fully extended position of the shock absorber.

14. In apparatus normally subjected to heavy torsional strains, a cylinder, a piston slidable therein, said piston and cylinder having cooperating splines and spline grooves, said piston having a hollow piston rod of an external diameter slightly less than the internal diameter of the splined portion of the cylinder, the open end of the cylinder being enlarged, and an annular guiding element mounted in said cylinder enlargement engaging the piston rod.

15. In an airplane landing gear, a ground wheel mounting comprising a wheel spindle, a hydraulic shock absorber having two telescoping hollow cylinders, the lower cylinder being rigidly attached to said spindle and the upper cylinder being adapted to be attached to an airplane, splines on the inner end of the inner cylinder, and cooperating splines on the outer cylinder, the outer cylinder at its inner end carrying packing, and the inner cylinder being closed at its inner end and its hollow shank portion having a smooth surface behind its splines engaged by said packing, said smooth surface being of a diameter slightly less than the diameter of the splined portion so as to clear the splines on the outer cylinder.

16. In an airplane landing gear, a ground wheel mounting comprising a wheel spindle, a hydraulic shock absorber having two telescoping hollow cylinders, the lower cylinder being rigidly attached to said spindle and the upper cylinder being adapted to be attached to an airplane, a closure for the inner end of the inner cylinder, said inner cylinder having external splines at its inner end and said outer cylinder having internal splines cooperating with said external splines, said splines being spaced at acute angles throughout the complete circle, the outer cylinder at its inner end carrying packing, and the hollow shank portion of the inner cylinder having a smooth surface behind its splines engaged by said packing.

17. In an airplane landing gear, a ground wheel mounting comprising a wheel spindle, a hydraulic shock absorber having two telescoping hollow cylinders, the lower cylinder being rigidly attached to said spindle and the upper cylinder being adapted to be attached to an airplane, a slide bearing between the inner end of the inner cylinder and the internal wall of the outer cylinder, a second slide bearing between the inner end of the outer cylinder and the external wall of the hollow shank portion of the inner cylinder, and interfitting splines in said first named bearing, each set of splines being rigidly held against rotational movement with respect to its cylinder.

18. In a hydraulic shock absorber, two telescoping hollow cylinders, a liquid metering partition across the outer cylinder intermediate its ends, internal splines in said outer cylinder extending from said partition toward the inner end of the cylinder, a piston head at the inner end of said inner cylinder, external splines on said piston head interfitting with said internal splines, packing carried by the outer cylinder at its inner end, said packing engaging the hollow shank portion of the inner cylinder behind the splined portion thereof, the length of the chamber between the piston head and the said partition being substantially no greater than the maximum stroke of the shock absorber.

19. In a hydraulic shock absorber for airplanes, two hollow telescoping cylinders, a partition across the outer cylinder intermediate its ends, internal splines in said outer cylinder extending from said partition toward the inner end of the cylinder, a piston head at the inner end of the inner cylinder, a metering pin mounted in said piston head extending through a metering opening in said partition, external splines on said piston head interfitting with said internal splines, packing carried by the outer cylinder at its inner end, said packing engaging the hollow shank portion of the inner cylinder behind the splined portion thereof, the length of the chamber between the piston head and the said partition being substantially no greater than the maximum stroke of the shock absorber.

20. In an airplane landing gear, a ground wheel mounting comprising a wheel spindle, a hydraulic shock absorber having two telescoping hollow cylinders, the lower cylinder being rigidly attached to said spindle and the upper cylinder being adapted to be attached to an airplane, the outer cylinder having an enlargement at its inner end adapted to receive packing and having internal splines beginning behind said enlargement, and the inner cylinder having a piston head on its inner end provided with splines adapted to interfit with the first named splines, each set of splines being rigidly held against rotation with respect to its cylinder, whereby the apparatus may be assembled by inserting the inner cylinder with piston head in place into the inner end of the outer cylinder, and thereafter placing packing in said enlargement.

21. In a shock absorber, two upright telescoping cylinders, the lower one carrying a wheel mounting and the upper one comprising means for attachment to an airplane, and means upon the inner cylinder cooperating with means upon the outer cylinder for preventing relative rotation of the two cylinders about their common axis, the outer cylinder at its inner end carrying packing and the inner cylinder having a smooth surface behind its rotation preventing means engaged by said packing.

22. In apparatus normally subjected to heavy torsional strains, a cylinder, a piston slidable therein, said piston and cylinder having cooperating means for preventing relative rotation about their common axis, said piston having a hollow piston rod of an external diameter slightly less than the internal diameter of the rotation preventing means of the cylinder, the open end of the cylinder being enlarged and an annular guiding element mounted in said cylinder enlargement engaging the piston rod.

JOHN F. WALLACE.